Oct. 18, 1966    H. D. SCHNEYER    3,279,997
ENTERIC COATED CALCIUM LACTATE TABLETS CONTAINING AN
ANTIHISTAMINE AND THIAMINE CHLORIDE
Filed Oct. 22, 1963
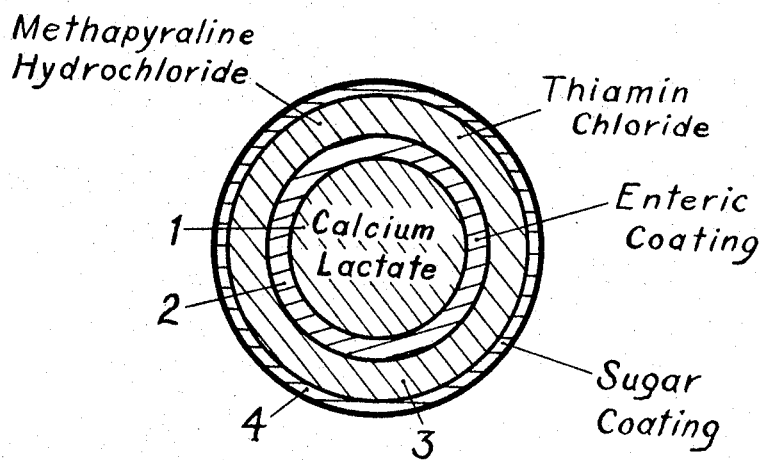
INVENTOR
Herbert D. Schneyer
BY Felix A. Russell
ATTORNEY

# United States Patent Office 3,279,997
Patented Oct. 18, 1966

3,279,997
ENTERIC COATED CALCIUM LACTATE TABLETS CONTAINING AN ANTIHISTAMINE AND THIAMINE CHLORIDE
Herbert D. Schneyer, Stevenson, Md.
Filed Oct. 22, 1963, Ser. No. 318,779
6 Claims. (Cl. 167—82)

The present invention relates to a composition which, in the novel form described hereinafter, aids in the treatment of bronchial asthma and similar or affiliated diseases.

More particularly, the invention relates to enteric coated, or other separatory tablets or capsules or similar medications of calcium lactate, or other salts, esters and derivatives of lactic acid, or lactic acid itself, or other acids related to lactic acid, or their salts, esters or other derivatives. This application is a continuation-in-part of my copending application Serial No. 124,305, filed July 10, 1961, now abandoned, which in turn is a continuation-in-part of my application Serial No. 836,174, filed August 26, 1959, now abandoned.

In normal oral administration calcium lactate will dissolve in the stomach so as to produce merely an alkalizing effect. On the other hand, the present invention contemplates the use of a lactic acid salt, such as calcium lactate, which is covered with a suitable enteric coating to prevent the dissolution of the calcium lactate in the stomach. The next layer contains thiamin chloride and an antihistamine, such as methapyrilene hydrochloride, followed by a sugar coating. Thus, the thiamin chloride and the methapyrilene hydrochloride are dissolved in the stomach, but the calcium lactate bypasses the stomach and does not dissolve until it reaches the intestines.

Therefore, it is a principal object of the present invention to provide a composition, or tablet, of the type described above for use in the treatment of bronchial asthma and similar or affiliated diseases.

Other and further objects and advantageous features of the present invention will appear hereinafter in connection with a detailed description of the drawing wherein the sole figure represents a semi-diagrammatic cross-sectional view through one of the tablets or pills constructed in accordance with the present invention.

Referring to the drawing, the core 1 of the tablet is composed of a salt or ester of lactic acid, preferably calcium lactate. The calcium lactate is covered by a suitable enteric coating 2, of any conventional composition, which permits the calcium salt to bypass the stomach and to dissolve in the intestines. The next layer 3 consists of the thiamin chloride and an antihistamine, such as methapyrilene hydrochloride. The outer shell 4 is a sugar coating.

Example 1

A suitable unit dosage pill or tablet includes about 5 grains of calcium lactate in the core. The enteric coating is made according to standard U.S.P. specifications, as indicated above. The next coating includes 25 mg. of thiamin chloride and 12.5 mg. of methapyrilene hydrochloride. The outer coating is the sugar coat.

To prepare 105,000 tablets, proceed as follows:

Mix together calcium lactate N.F. 75 lbs. and corn starch 12½ lbs. Dampen the above mixture with 3 gallons of a solution of ethyl cellulose in alcohol. This solution is prepared by dissolving 1 lb. of ethyl cellulose in sufficient alcohol to make 1 gallon. Dry the wetted mass at 140° F. Mill the dried mass thus obtained, using a Fitzpatrick mill operated at low speed, equipped with #2 screen. Add 12 oz. talc and 6 oz. magnesium stearate. Compress the mixture into tablets having a gross weight of 5 grains. (The loss of moisture from the calcium lactate compensates for the weight of excipients added.)

Transfer the tablets to a coating pan and coat with cellulose acetate phthalate. Test the tablets after about seven coats have been applied, using standard U.S.P. Disintegration Testing Apparatus. The tablets should resist simulated gastric fluid U.S.P. for one hour, simulated intestinal fluid U.S.P. modified to pH 4.5 for an additional hour, and simulated intestinal fluid U.S.P. modified to pH 6.9 for an additional hour. They should then disintegrate when transferred to simulated intestinal fluid U.S.P. modified to pH 7.2 within one hour. If this is not the case, add additional coats of cellulose acetate phthalate and recheck the disintegration procedure. When the tablets have been satisfactorily coated, return them to the coating pan. Coat on, using techniques well known in the trade, 3 lbs. 3 oz. of methapyrilene hydrochloride (10% excess is used here to allow for the portion which adheres to the interior of the pan.) The coating solution used is a sugar-gelatin aqueous solution. Then coat on 7 lbs. of thiamin hydrochloride, using the same solution. (A 20% excess of thiamin is used here to allow for the thiamin which adheres to the interior of the coating pan and also to provide for an excess to insure adequate shelf life.) Finish the tablets, using syrup containing 5 grams of FD&C #4 Certified Dye, per gallon.

Example 2

A similar procedure is followed in making a similar tablet having five grains of sodium lactophosphate in the core. The rest of the tablet would be the same as Example 1.

Example 3

A suitable unit dosage pill or tablet includes about 5 grains of lactic acid in the core. The enteric coating is made according to standard U.S.P. specifications, as indicated above. The next coating includes 25 mg. of thiamin chloride and 12.5 mg. of methapyrilene hydrochloride. The outer coating is the sugar coating.

However, due to the fact that lactic acid is a syrupy liquid it is necessary to first gelatinize the syrup with sufficient corn starch to make a crumbly dry mass.

Whereas the present invention has been described with particular relation to specific antihistamines, it should be obvious that it is possible to employ other antihistamines, for example, such as (and without limitation), diphenhydramine, pyrilamine, tripelennamine, phiniramine, as well as any of the many other pharmaceutically acceptable antihistamines. Also, other compounds having antihistamine activity in vivo could be employed.

Whereas the present invention has been described with particular relation to the drawing and to the examples included herein, it should be pointed out that other and further modifications may be made within the scope of this invention.

What is claimed is:

1. A medical composition comprising, in combination, a compound selected from the group consisting of lactic acid, calcium lactate, sodium lactophosphate, said compound being covered with an enteric coating, thiamin chloride and an antihistamine.

2. A medical composition according to claim 1 wherein the antihistamine is methapyrilene hydrochloride.

3. A medical tablet comprising an inner core containing about 5 grains of calcium lactate, an intermediate enteric coating covering said core, and an outer stomach-soluble coating containing about 25 mg. of thiamin chloride and about 12.5 mg. of methapyrilene hydrochloride.

4. A medical tablet comprising an inner core containing about 5 grains of sodium lactophosphate, an intermediate enteric coating covering said core, and an outer stomach-soluble coating containing about 25 mg. of thiamin chloride and about 12.5 mg. of methapyrilene hydrochloride.

5. A medical tablet comprising an inner core containing a compound selected from the group consisting of lactic acid, calcium lactate, sodium lactophosphate, an intermediate enteric coating covering said core, and an outer stomach-soluble coating containing thiamin chloride and antihistamine.

6. A method for making a medical tablet comprising mixing calcium lactate with corn starch, dampening the mixture with an alcoholic solution of ethyl cellulose, drying the mixture, adding talc and magnesium stearate, compressing into tablet form, coating the tablets with cellulose acetate phthalate, then coating with an aqueous gelatin solution containing methapyrilene hydrochloride, and thereafter coating with an aqueous gelatin solution containing thiamin hydrochloride.

References Cited by the Examiner

UNITED STATES PATENTS 2,099,403  11/1937  Keller _____ 167—82
2,866,735  12/1958  Himelick _____ 167—82

OTHER REFERENCES

Osol et al.: U.S. Dispensatory, 25th ed., 1955, Lippincott Co., Philadelphia, Pa., pp. 226, 843–844, 1413 and 1416.

Wood: U.S. Dispensatory, 1943, Lippincott Co., Philadelphia, Pa., p. 237.

JULIAN S. LEVITT, *Primary Examiner.*

GEORGE A. MENTIS, *Assistant Examiner.*